J. L. LINDERMAN.
Seed Planter.
No. 81,914.                                                            Patented Sept. 8, 1868.
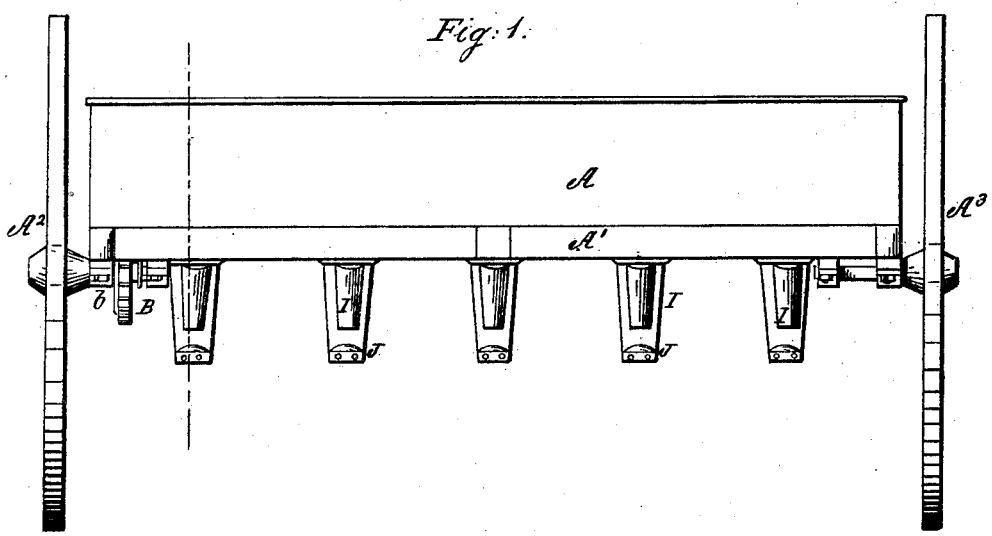
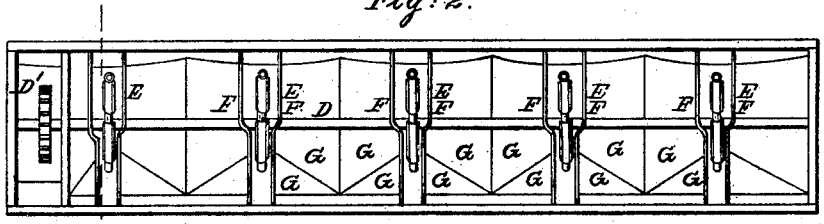
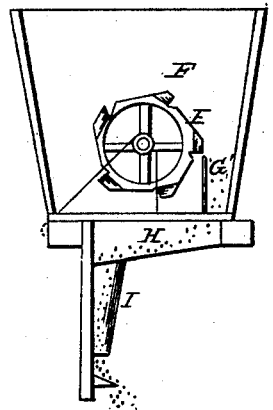
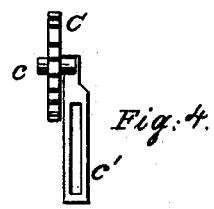
Witnesses.
Inventor.

United States Patent Office.

JAMES L. LINDERMAN, OF ROCKFORD, ILLINOIS.

Letters Patent No. 81,914, dated September 8, 1868.

IMPROVEMENT IN SEEDING-MACHINES.

The Schedule referred to in these Letters Patent and making part of the same.

TO ALL WHOM IT MAY CONCERN:

Be it known that I, JAMES L. LINDERMAN, of Rockford, in the county of Winnebago, and State of Illinois, have invented new and useful Improvements in Seed-Sowers; and I do hereby declare that the following is a full and exact description of the same, reference being had to the accompanying drawings, and to the letters of reference marked thereon.

This invention relates to certain improvements in broad-cast seed-sowers, and consists principally in a novel arrangement of devices, whereby the seed to be sown is regularly delivered from the hopper to the scatterer; also in a peculiar arrangement whereby the amount of seed sown is regulated, all of which will be fully described hereinafter.

Figure 1 represents a front elevation of my improved seeder.

Figure 2, a plan view of the hopper.

Figure 3, a sectional view, through the line $x$–$y$, in figs. 1 and 2; and

Figure 4, a plan view of the slotted bearing and gear-wheel detached.

In the drawings—

A represents the hopper, which is suitably supported upon the framework $A^1$, and wheels $A^2$ $A^3$.

B represents a loose gear-wheel, upon the axle of the wheel $A^2$, which is thrown into contact with the clutch-wheel $b$, upon the same axle, when desired, by means of any suitable leyer-arrangement.

C represents an idle-wheel, which revolves upon shaft $c$, of the slotted bearings $c'$. This wheel may be easily removed from shaft $c$, when it is desired to use a different size, to change the speed of the feeding-shaft.

D′ represents a gear-wheel, upon the end of shaft D, which wheel engages with idle-wheel C.

D represents a shaft, passing through the centre of hopper A, upon which the feeding-wheels are placed. Motion is given to the shaft by means of the wheel $A^2$, through the various constructions described.

E E represent the feeding-wheels, which are placed upon shaft D, at regular and suitable intervals, and by means of which the grain is delivered to the scatterers. These wheels are of peculiar construction and shape, as shown in figs. 2 and 3, being provided on their outer edge with a series of cups and channels, the back of each cup forming a channel for the seed which falls from the succeeding cup. These channels are made wide at their rear ends in order that all the seed may be caught and be properly conducted to the spout. They are also constructed with sharp bevelling edges in order that they may easily pass through the mass of grain. The wheels E are so arranged on the shaft as to leave a slight space between the outer edges and the bottom of the hopper, for the purpose of allowing the seed room for some motion as the wheels revolve, by which means the cups are not heaped, but are only filled.

F F represent partitions partially enclosing the wheels E E, which are constructed with openings in the lower and rear parts, as shown, by which means the seed is allowed to flow down the double inclines G G to the feeding-wheels. The partitions are located a little distance apart at the rear end, in order that the seed may not choke the wheels, but near together at the front end, in order that the seed may be properly conducted to the spouts.

G′ G′ represent spouts, located in the front part of the hopper, between the partitions F F, into which the feeding-wheels deliver.

H H represent conductors, placed beneath the hopper, and connecting with spouts G G. These conductors have an inclined bottom, which lead the seed to the delivery-tubes I I. They are also made wider at the forward than at the rear ends. By this construction the seed is spread as it is received from the spouts, and delivered to tubes I in a thin stream.

J J represent the scatterers proper, upon which the seed falls from tube I.

The operation of my invention is as follows:

The hopper having been filled, motion is communicated to the machine. When it is desired to sow the seed, the wheel B is thrown into gear, by which means motion is communicated to the shaft D.

The cups of wheels E E fill with seed as the latter revolve, and discharge into spouts G G, in which the seed is led to conductors H H. In these latter the seed is spread, and led to tubes I I, through which it falls, and, striking upon scatterers J J, is evenly distributed. A larger or smaller amount of seed is sown by increasing or decreasing the speed of the revolutions of the feeding-wheels. This is easily accomplished by removing the idle-wheel C from shaft $c$, and substituting therefor a larger or smaller wheel, as may be desired. The slotted bearings allow different sizes to be easily used.

Having thus fully described my invention, what I claim as new, and desire to secure by Letters Patent, is—

1. The wheels E, provided with seed-channels upon their peripheries, extending rearward from the seed-cups, and made tapering in form, as shown and described, for the purpose set forth.

2. The wheels E, constructed as described, in combination with partitions F, constructed and arranged as described, double inclines G, and spouts G', the whole being combined and operated substantially as and for the purpose described.

3. The wheel C, shaft $c$, and slotted bearings $c'$, in combination with gear-wheels B D', and frame A, as and for the purpose described.

This specification signed and witnessed, this eleventh day of April, 1868.

JAMES L. LINDERMAN.

Witnesses:
   O. A. PENNOYER,
   G. W. FORET.